United States Patent
Tseng et al.

(10) Patent No.: US 8,228,472 B2
(45) Date of Patent: Jul. 24, 2012

(54) ELECTRICALLY TUNABLE LIQUID CRYSTAL LENS WITH CENTRAL ELECTRODE

(75) Inventors: Ling-Yuan Tseng, Saratoga, CA (US); Cheng-Hsing Liao, Hsinchu (CN)

(73) Assignee: Tunable Optix Corporation, Hsinchu Science Park, Hsinchu (TW)

( * ) Notice: Subject to any disclaimer, the term of this patent is extended or adjusted under 35 U.S.C. 154(b) by 185 days.

(21) Appl. No.: 12/396,613

(22) Filed: Mar. 3, 2009

(65) Prior Publication Data

US 2009/0219475 A1    Sep. 3, 2009

Related U.S. Application Data

(60) Provisional application No. 61/033,050, filed on Mar. 3, 2008.

(51) Int. Cl.
*G02F 1/1337* (2006.01)
*G02F 1/13* (2006.01)

(52) U.S. Cl. ........................................ 349/123; 349/200

(58) Field of Classification Search .................. 349/200
See application file for complete search history.

(56) References Cited

U.S. PATENT DOCUMENTS

| | | | |
|---|---|---|---|
| 2002/0145701 A1 | 10/2002 | Sun et al. | |
| 2006/0164593 A1* | 7/2006 | Peyghambarian et al. | ... 349/200 |
| 2007/0139333 A1 | 6/2007 | Sato et al. | |
| 2007/0183293 A1 | 8/2007 | Murata et al. | |
| 2011/0205342 A1* | 8/2011 | Lin et al. | ......................... 348/54 |

FOREIGN PATENT DOCUMENTS

| | | |
|---|---|---|
| JP | 10092003 A | 4/1998 |
| JP | 2003-071921 A | 3/2003 |
| JP | 2004-004616 A | 1/2004 |

OTHER PUBLICATIONS

Hongwen Ren et al., Adaptive liquid crystal lens with large focal length tunability, Optics Express, 2006, pp. 11292-11298, vol. 14.
Hongwen Ren et al., Liquid crystal lens with large focal length tunability and low operating voltage, Optics Express, Sep. 3, 2007, pp. 11328-11335, vol. 15, No. 18.
A.F. Naumov et al., Control optimization of spherical modal liquid crystal lenses, Optics Express, Apr. 26, 1999, pp. 344-352, vol. 4, No. 9.

(Continued)

*Primary Examiner* — Sarah Hahm
(74) *Attorney, Agent, or Firm* — Winston Hsu; Scott Margo

(57) ABSTRACT

A liquid crystal lens cell comprises a pair of flat layers with the liquid crystal lens supported between the layers. One of the layers supports a planar electrode made of ITO. The other electrode, also formed of ITO, is supported in the center of the opposing substrate and projects downwardly toward the center of the liquid crystal layer. A power supply creates a potential difference between the two electrodes and accordingly imposes a non-uniform electric field on the liquid crystal modules which aligns them in which a way as to act as a lens. By varying the voltage between the two electrodes the focal length of the lens may be controlled. A central electrode may be in the form of a beam or of a pointed tip. In other embodiments of the invention an electrode having a central hole may be associated with the central electrode or the planar electrode.

10 Claims, 3 Drawing Sheets

OTHER PUBLICATIONS

Shin Masuda et al., Liquid-crystal microlens with a beam-steering function, Applied Optics, Jul. 10, 1997, pp. 4772-4778, vol. 36, No. 20.

Toshiaki Nose et al., A Liquid Crystal Microlens with Hole-Patterned Electrodes on Both Substrates, Japanese Journal of Applied Physics, May 1992, pp. 1643-1646, vol. 31.

Mao Ye et al., Liquid Crystal Lens with Insulator Layers for Focusing Light Waves of Arbitrary Polarizations, Japanese Journal of Applied Physics, 2003, pp. 6439-6440, vol. 42.

Michinori Honma et al., Improvement of Aberration Properties of Liquid Crystal Microlenses using the Stacked Electrode Structure, Japanese Journal of Applied Physics, 2001, pp. 1322-1327, vol. 40.

* cited by examiner

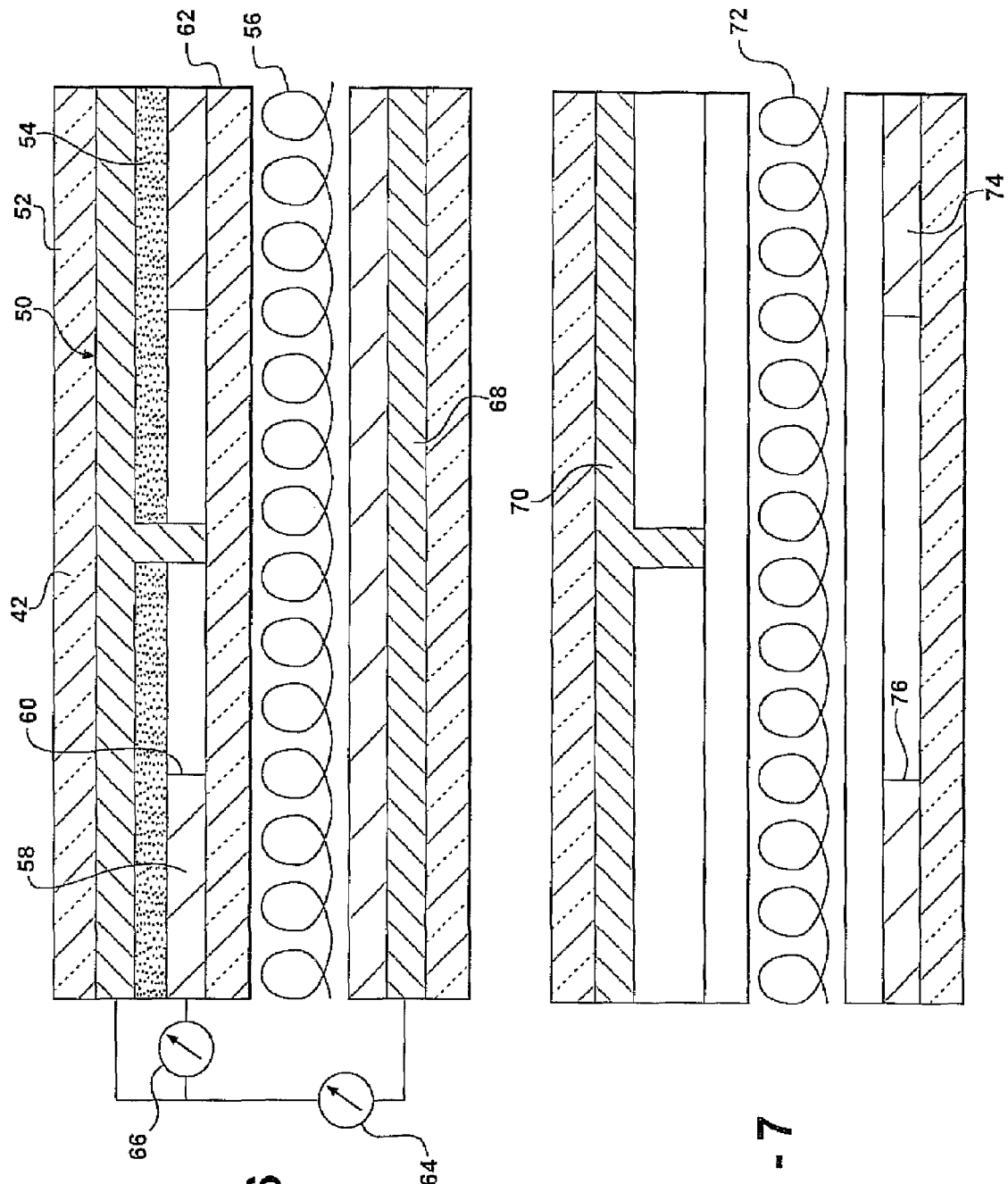

ELECTRICALLY TUNABLE LIQUID CRYSTAL LENS WITH CENTRAL ELECTRODE

CROSS-REFERENCE TO RELATED APPLICATIONS

This Application claims priority of U.S. Provisional Patent Application Ser. No. 61/033,050, filed Mar. 3, 2008, which is incorporated herein by reference.

FIELD OF THE INVENTION

This invention relates to liquid crystal cells sandwiched between electrodes which exert a non-uniform field on the liquid crystals so as to cause them to act as lenses, and more particularly to such a cell in which the voltage between the electrodes may be varied to control the focal length of the lens.

BACKGROUND OF THE INVENTION

Electrically tunable liquid crystal lenses potentially provide important advantages of size and cost over mechanical zoom lenses. They might be used in cameras, binoculars and other opto-electronic devices.

Broadly, these devices employ a pair of electrodes sandwiching a liquid crystal cell. The electrodes are such as to align the liquid crystal molecules to provide a gradient refractive index profile on the lens, transverse to the light path. By use of a variable power supply to adjust the voltage between the electrodes, the focal lengths of the lenses can be varied between a very short focal length and to near infinity. One method proposed to generate a nonhomogeneous electric field within the LC layer is to provide one of the electrodes in spherical shape. Another proposal is to place a central hole in one of the electrodes so as to impose a nonhomogeneous across the LC element.

SUMMARY OF THE INVENTION

The present invention comprises an electrically tunable LC lens embodying an LC layer sandwiched between two planar nonconductive layers. One of the nonconductive layers is coated with an ITO (indium tin oxide) layer which acts as a transparent electrode. The other nonconductive layer is formed with a central electrode that projects toward the LC layer and the other electrode. The central electrode may take the form of a thin rod with its axis aligned normally to the LC layer or an electrode with a pointed tip terminating close to the LC layer. Either form of electrode may be connected to a power supply at the other end by either a conductive transparent ITO coating extending over an insulation layer or a single transparent conductor formed on the side of the insulation layer opposite to the LC layer. The insulation layer separates this conductive layer from the electrode tip so that the electric field imposed on the LC layer is primarily a function of the voltage between the central tip and the electrode layer on the opposite side of the LC layer.

The resulting nonhomogeneous field aligns the LC molecules so as to produce a refractive index gradient over the LC layer which causes it to act as a lens. By varying the voltage between the tipped electrode and the opposed flat electrode, the focal length of the resulting lens may be controlled.

This unique electrode structure can be combined with an ITO layer having a central hole which is substantially larger than the tip electrode diameter. This electrode could be formed on the opposite side of the insulation layer from which the tip electrode projects or it could constitute the opposing electrode on the opposite side of the LC layer.

The birefringency problem caused by liquid crystal material can be resolved either by use of two layers of liquid crystal aligned in orthogonal directions or through the use of a tin layer of polarizer film attached on top of the LC layer.

BRIEF DESCRIPTION OF THE DRAWINGS

Other objects, advantages and applications of the present invention will be made apparent by the following detailed description of preferred embodiments of the invention. The description makes reference to the accompanying drawings in which:

FIG. 6 is a schematic view of a layer for an LC electrically tunable lens employing a tip electrode in connection with an electrode having a central hole; and FIG. 7 is a schematic diagram of an LC electrically tunable lens structure employing a tip electrode on one side of the LC layer and an electrode with a central hole on the other layer.

DETAILED DESCRIPTION OF A PREFERRED EMBODIMENT OF THE INVENTION

Figure 1:
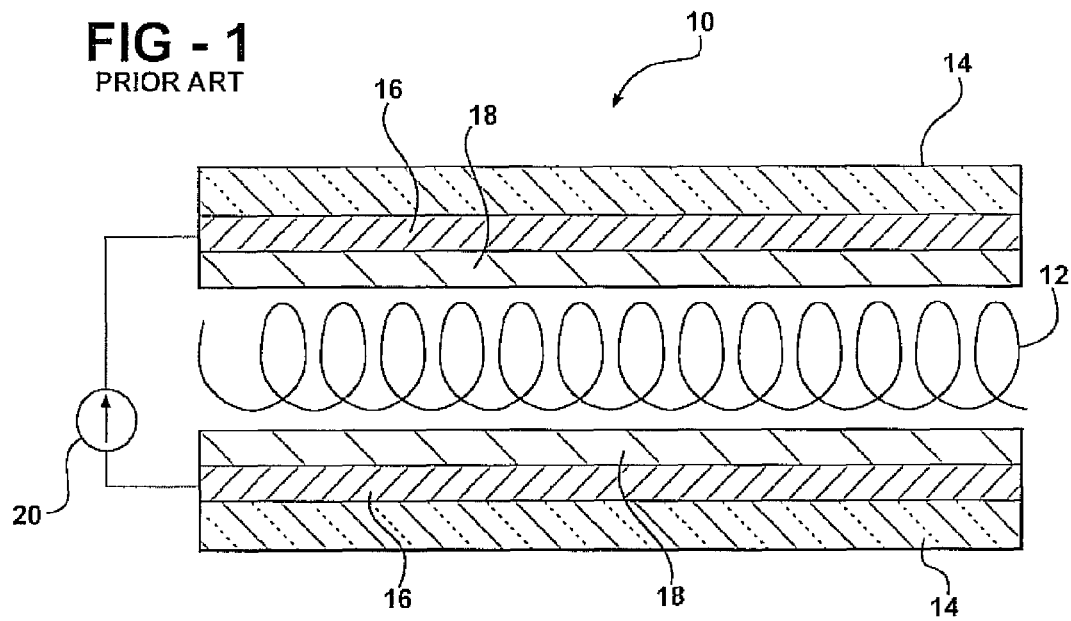
FIG. 1 is a schematic diagram of a conventional electrically tunable liquid crystal cell structure representing the prior art.

Referring to the drawings, FIG. 1 illustrates a prior art, electrically tunable liquid crystal cell, generally indicated at 10. The cell employs a planar liquid crystal layer 12 sandwiched between a pair of glass substrates 14. The opposed surfaces of the glass layers 14 are each coated with a thin ITO electrode 16. The surfaces of the ITO layer proximate the liquid crystal layer 12 are coated with alignment layers 18 which are preferably polyimide, $SiO_2$, or SiOx.

The two ITO layers are connected to a variable voltage power supply 20. By varying the voltage on the two ITO electrodes, a field is imposed on the LC layer which causes the LC molecules to align and produce a lens-like refraction of light passing through the cell. By adjusting the strength of the field the alignment may be varied to modify the focal length of the lens.

Figure 2:
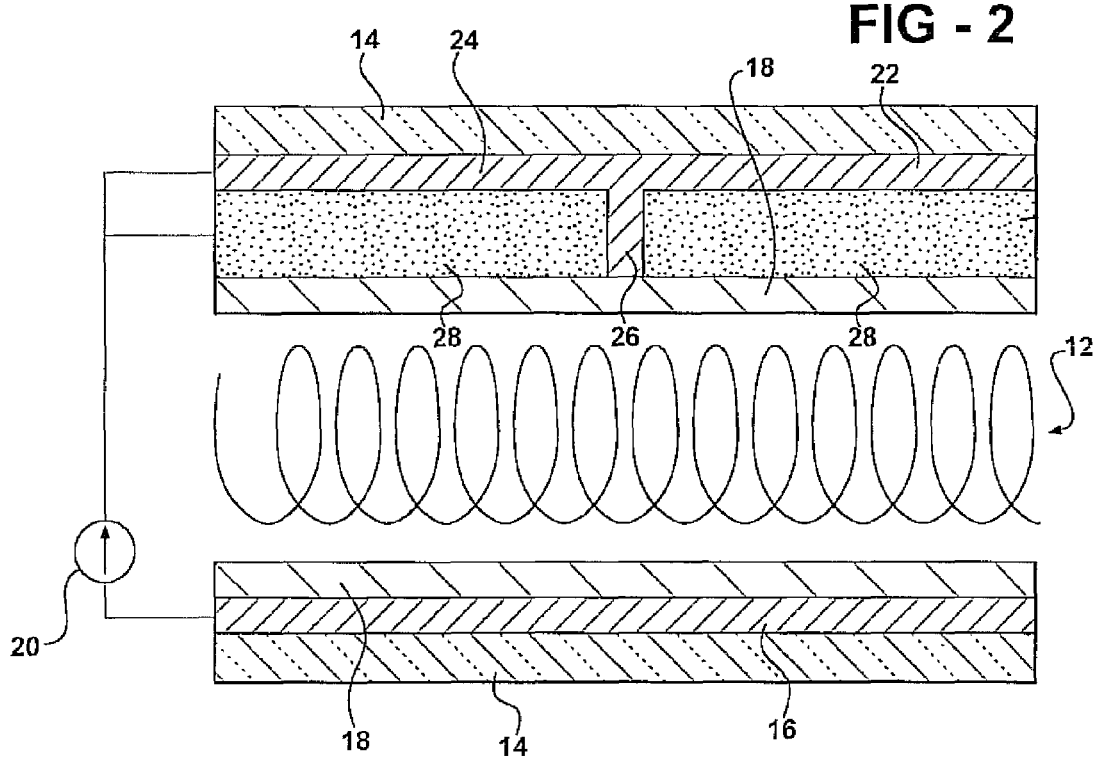
FIG. 2 is a schematic diagram of an electrically tunable liquid crystal cell structure forming a first embodiment of the invention.

FIG. 2 illustrates a preferred embodiment of our invention with the same numerals applied to the parts that are equivalent to the parts of the prior art device of FIG. 1. The preferred embodiment of the invention differs from the prior art in the structure of one of the ITO layers 22 and in the provision of an insulation layer 24. The ITO layer 22 is formed on the side of one of the glass layers 14 that opposes the liquid crystal layer 12. The electrode comprises a thin ITO layer 24 and a central tip 26 that projects from the surface of the layer 24 toward the LC layer 12. An alignment layer 18 is formed beyond the edge of the tip 26 so as to be proximate to the LC layer 12. The space between the section 24 of the ITO layer and the alignment layer 18 is coated with an insulation layer 28. The insulation layer must be electrically insulating and transparent. Preferably SiO₂ or SiOx may be employed. Since this insulation layer is adjacent to the alignment layer 18, they can be formed integrally. However, the surface of the alignment layer adjacent to the LC layer 12 must have some kind of grooves or rough formation so that the liquid crystal modules will fall into the layer, forming an angle typically referred to as the pre-tilting angle. If the alignment layer is SiO₂ or SiOx, then a sputtering or evaporating process may be used to form that layer as well as the insulation material. The thickness of the insulation layer could vary from several microns to several hundred microns. The alignment layer thickness is usually less than one micron. If the insulation layer and the alignment layer use the same inorganic material, then the insulation layer can serve as a base material and would be deposited vertically, while the alignment will be deposited obliquely. If the alignment layer uses an organic material such as polyimide, then a rubbing process will be used to create the pretilt angle.

The central projecting tip 26 of the ITO layer 24 results in a more intense field being opposed in the center of the LC layer, compared to its edges, so as to give a lens-like curvature to the refractive index of the LC layer. This produces a lens-like effect when incident light passes through the cell.

Figure 3:
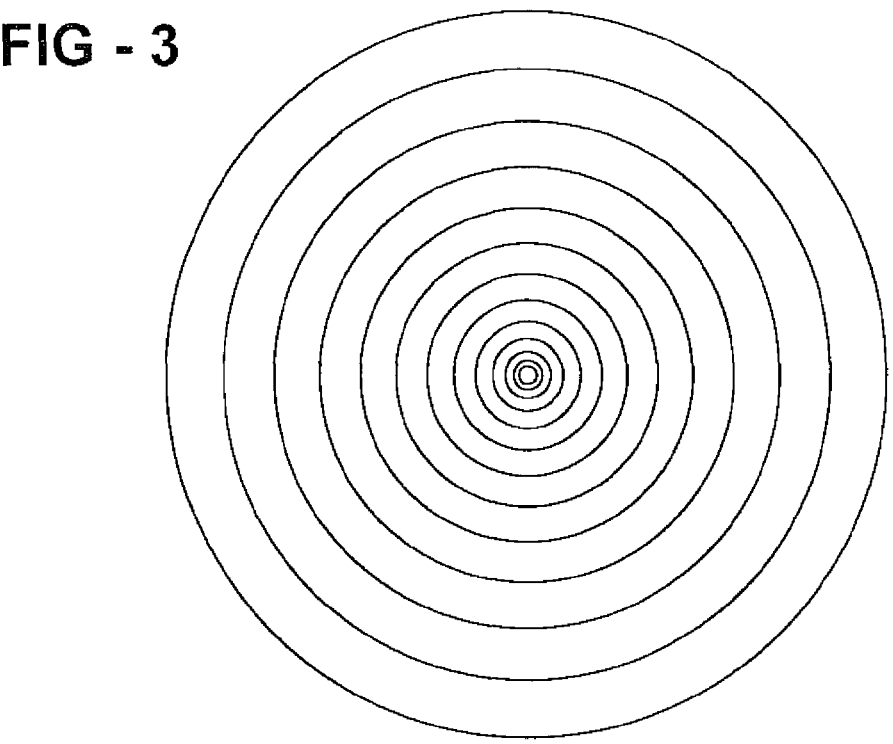
FIG. 3 is a plot of the interference fringes resulting from passing light through an electrically tunable liquid crystal structure formed in accordance with the present invention.

FIG. 3 is a diagram of the interference fringes produced when light passes through the structure of FIG. 1. The tip electrode 26 produces a fringe pattern of the highest frequency at the center and lowering in the direction of the edges.

Figure 4:
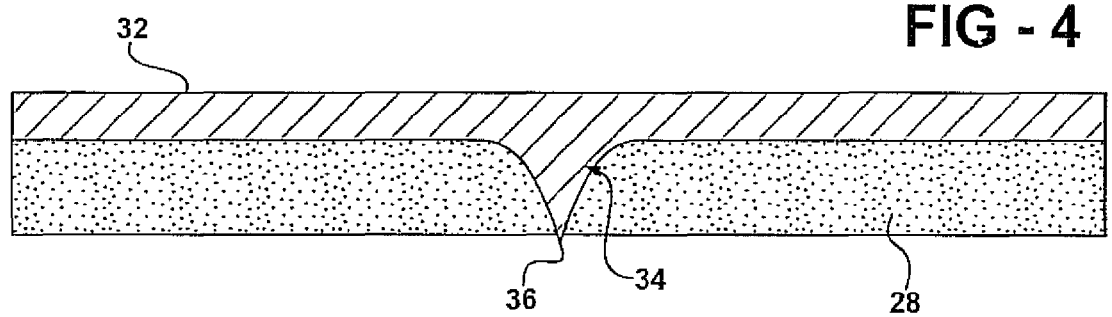
FIG. 4 is an illustration of an alternative embodiment of the tip electrode for use in an LC electrically tunable lens structure.

FIG. 4 illustrates an alternative form of the tip electrode which may be used with a structure of the type shown in FIGS. 1 and 2. The insulation layer 28 supports an ITO layer 32 which overlies the side of the insulation layer opposite to the LC layer and includes a central, pointed tip 34 which terminates in a pointed end 36 adjacent to the alignment layer. The pointed tip 36 produces a more extreme electric field gradient on the LC layer and allows even shorter focal distances to be achieved by the lens. Focal lengths in the order of seven centimeters have been achieved in prototype devices.

Figure 5:
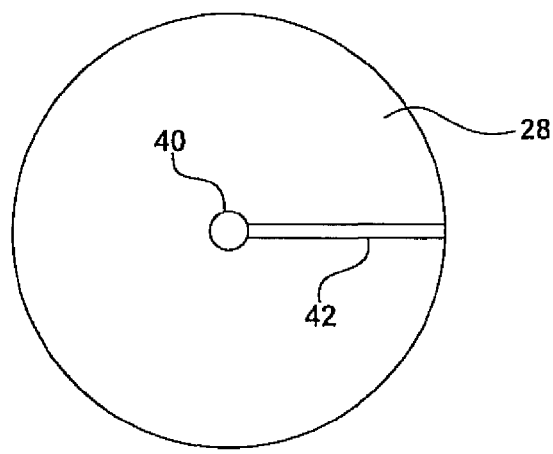
FIG. 5 is a top view of an LC lens structure using the tip electrode, illustrating an alternative of the method of connecting the central electrode to a power supply.

FIG. 5 is a top view of an alternative form of insulation layer and ITO layer. Rather than the ITO layer covering the entire surface of the insulation layer as illustrated in FIGS. 2 and 4, a central ITO tip in the form of the tips 26 of FIG. 2 or 34 of FIG. 4, indicated in FIG. 5 as 40, may be connected to a power supply by an ITO conductor 42 which connects the tip 40 to the edge of the insulation layer so that it can be connected to a power supply. This structure allows the use of thinner insulation layers 28 because the electric field imposed by the conductor 42 is so minimal as to not affect the performance of the device.

FIG. 6 illustrates an alternative structure for a tip electrode cell. A tip electrode 50 of the type illustrated in FIG. 2 is sandwiched between a glass substrate 52 and an insulating layer 54. A second ITO electrode 58 having a central hole 60 is formed surrounding the tip of the ITO layer 50. An alignment layer 62 completes the structure. A first variable voltage power supply 64 connects to the tip electrode 50. A second variable voltage power supply 66 is connected between the terminal of the power supply 64 that connects to the tip ITO layer 50 and the ITO layer 58 with the central hole 60. The other terminal of the power supply 64 connects to the planar ITO layer 68 supported on the opposite side of the liquid crystal layer 56. By varying the voltages imposed by the power supply 64 and 66, the focal length (and other optical parameters such as aspherical effects) of the resulting lens can be carefully controlled between a focus at near infinity and a focus within a few centimeters of the cell.

In another embodiment of the invention illustrated in FIG. 7, an ITO in the form of a tip electrode 70 is supported on one side of an LC layer 72 and an ITO electrode 74 with a large central hole 76 is supported on the opposite side of the LC layer 72. Varying an applied voltage between these two layers will allow control of the focal length (and other optical parameters) of the resulting lens over a wide range.

We claim:

1. An electrically tunable liquid crystal lens comprising:
    a planar liquid crystal layer supported between an opposed pair of transparent, insulating, alignment layers;
    a first planar electrode formed of a transparent conductive material supported adjacent to one of the alignment layers on the opposite side of the liquid crystal layer;
    a second transparent conductive electrode disposed on the second alignment layer on the side opposite to the liquid crystal layer, the second electrode comprising only one central tip electrode; and
    a variable voltage power supply connected to the first and second electrodes so as to impose a nonhomogeneous electric field on the liquid crystal layer, the field having a maximum intensity at a center of the electrodes and decreasing toward the edges of the electrodes, so that the refractive index of the liquid crystal layer is adjusted in a nonhomogeneous manner to provide a lens effect to light passing through the cell, the focal length of the lens being a function of the applied voltage between the electrodes.

2. The liquid crystal lens of claim 1 including a transparent insulation layer surrounding a central section in abutment to the alignment layer.

3. The liquid crystal lens of claim 2 further including a pair of glass substrates disposed in contact with the first and second electrodes on the sides of said first and second electrodes opposed to the liquid crystal layer.

4. The liquid crystal lens of claim 3 further comprising a third electrode having a central hole therein and disposed between the glass substrates which supports the second electrode, with the only one central tip electrode extending centrally through the central hole in the third electrode; and a separate variable voltage power supply operative to vary the voltage between the third electrode and the first electrode.

5. The liquid crystal lens of claim 1 wherein the first electrode further comprises a layer extending over the entire liquid crystal layer and having an extension section supported at a center of the first electrode.

6. The liquid crystal lens of claim 1 further comprising a transparent conductive element connecting a central extension section to one terminal of the power supply.

7. The liquid crystal lens of claim 1 wherein the only one central tip electrode varies in width from a small tip at an end nearest to the liquid crystal layer to a larger diameter at an opposite end.

8. The liquid crystal lens of claim 1 wherein the first electrode has a central hole therein.

9. The liquid crystal lens of claim 1 wherein the transparent conductive electrodes constitute indium tin oxide.

10. A liquid crystal cell constituting an electrically controllable focal length lens, comprising:
    a liquid crystal layer sandwiched between first and second planar insulating transparent alignment layers;
    a transparent conductive electrode coated on a surface of the first alignment layer opposed to the liquid crystal layer and extending over the full width of the alignment layer;
    a second conductive transparent electrode supported on the side of the second alignment layer opposed to the liquid crystal layer, the second electrode having only one central tip electrode;

a transparent insulation layer disposed in contact with the side of the second alignment layer opposite to the liquid crystal layer and surrounding a projecting section of the second electrode;

planar glass substrates disposed in contact with the first and second electrodes on their sides opposite to the liquid crystal layer; and a variable voltage power supply connected to the first and second electrodes and operative to impose a nonhomogeneous electric field on the liquid crystal layer, the voltage of the power supply determining the focal length of the resulting lens.

* * * * *

UNITED STATES PATENT AND TRADEMARK OFFICE
CERTIFICATE OF CORRECTION

PATENT NO. : 8,228,472 B2
APPLICATION NO. : 12/396613
DATED : July 24, 2012
INVENTOR(S) : Ling-Yuan Tseng et al.

Page 1 of 1

It is certified that error appears in the above-identified patent and that said Letters Patent is hereby corrected as shown below:

On the title page, item (75), correct the citizenship of the second inventor from "Cheng-Hsing Liao (CN)" to --Cheng-Hsing Liao (TW)--.

Signed and Sealed this
Twenty-third Day of October, 2012

David J. Kappos
*Director of the United States Patent and Trademark Office*